US007716728B2

(12) United States Patent
Della-Libera et al.

(10) Patent No.: US 7,716,728 B2
(45) Date of Patent: May 11, 2010

(54) SECURITY SCOPES AND PROFILES

(75) Inventors: Giovanni M. Della-Libera, Seattle, WA (US); Vijay K. Gajjala, Sammamish, WA (US); Tomasz Janczuk, Sammamish, WA (US); John R. Lambert, Bellevue, WA (US)

(73) Assignee: Microsoft Corproation, Redmond, WA (US)

( * ) Notice: Subject to any disclaimer, the term of this patent is extended or adjusted under 35 U.S.C. 154(b) by 1475 days.

(21) Appl. No.: 10/779,922

(22) Filed: Feb. 16, 2004

(65) Prior Publication Data

US 2005/0182957 A1    Aug. 18, 2005

(51) Int. Cl.
G06F 12/14    (2006.01)
G06F 15/16    (2006.01)
H04L 29/06    (2006.01)

(52) U.S. Cl. ............................... 726/13; 726/1; 726/21; 713/154; 713/167; 707/9

(58) Field of Classification Search ........................ None
See application file for complete search history.

(56) References Cited

U.S. PATENT DOCUMENTS

| 5,446,903 | A | 8/1995 | Abraham et al. |
|---|---|---|---|
| 5,638,448 | A | 6/1997 | Nguyen |
| 5,838,903 | A | 11/1998 | Blakely, III et al. |
| 5,850,446 | A | 12/1998 | Berger et al. |
| 5,915,024 | A | 6/1999 | Kitaori et al. |
| 5,996,076 | A | 11/1999 | Rowney et al. |
| 6,002,767 | A | 12/1999 | Kramer |
| 6,014,666 | A | 1/2000 | Helland et al. |
| 6,058,426 | A | 5/2000 | Godwin et al. |
| 6,061,684 | A | 5/2000 | Glasser et al. |
| 6,088,805 | A | 7/2000 | Davis et al. |
| 6,141,754 | A | 10/2000 | Choy |
| 6,163,772 | A | 12/2000 | Kramer et al. |
| 6,233,576 | B1 | 5/2001 | Lewis |
| 6,253,027 | B1 | 6/2001 | Weber et al. |
| 6,279,111 | B1 | 8/2001 | Jensenworth et al. |
| 6,381,602 | B1 | 4/2002 | Shoroff et al. |
| 6,405,212 | B1 * | 6/2002 | Samu et al. ............. 707/103 R |
| 6,412,070 | B1 | 6/2002 | Van Dyke et al. |

(Continued)

OTHER PUBLICATIONS

Bertino, Elisa; Castano, Silvan; Ferrari, Elena, "On Specifying Security Policies for Web Documents with an XML-Based Langauge," May 2001, ACM Press, pp. 57-65.*

(Continued)

*Primary Examiner*—Kaveh Abrishamkar
(74) *Attorney, Agent, or Firm*—Lee & Hayes, PLLC

(57) ABSTRACT

A security system with a mechanism to identify types of information that need to be secured and another mechanism to specify how the types are to be secured. The system includes a sender having an application and a receiver having a security module and one or more datastores to store information related to types of information that need to be secured (e.g. "scopes"), how information is to be secured (e.g., "profiles"), and a mapping (e.g., "bindings") between the scopes and profiles. Scopes can be implemented by application developers. Profiles can be implemented by application deployers and/or administrators. The security module determines which scope is appropriate for the message, and then determines the profile that is mapped to the scope. The security module can then make an access control decision using the profile.

34 Claims, 5 Drawing Sheets

U.S. PATENT DOCUMENTS

| | | | |
|---|---|---|---|
| 6,434,607 | B1 | 8/2002 | Haverstock et al. |
| 6,446,206 | B1 | 9/2002 | Feldbaum |
| 6,449,633 | B1 | 9/2002 | Van et al. |
| 6,473,800 | B1 | 10/2002 | Jerger et al. |
| 6,487,600 | B1 | 11/2002 | Lynch |
| 6,510,458 | B1 | 1/2003 | Berstis et al. |
| 6,513,721 | B1 | 2/2003 | Salmre et al. |
| 6,625,603 | B1 | 9/2003 | Garg et al. |
| 6,643,684 | B1 | 11/2003 | Malkin et al. |
| 6,658,573 | B1 | 12/2003 | Bischof et al. |
| 6,675,353 | B1 | 1/2004 | Friedman |
| 6,681,380 | B1 | 1/2004 | Britton et al. |
| 6,754,829 | B1 | 6/2004 | Butt et al. |
| 6,807,636 | B2 * | 10/2004 | Hartman et al. ............... 726/14 |
| 6,854,056 | B1 | 2/2005 | Benantar et al. |
| 6,915,338 | B1 * | 7/2005 | Hunt et al. .................. 709/220 |
| 6,931,532 | B1 * | 8/2005 | Davis et al. .................. 713/167 |
| 7,010,681 | B1 * | 3/2006 | Fletcher et al. ............. 713/154 |
| 7,024,662 | B2 * | 4/2006 | Elvanoglu et al. ........... 717/127 |
| 7,062,566 | B2 * | 6/2006 | Amara et al. ............... 709/229 |
| 7,065,706 | B1 * | 6/2006 | Sankar ....................... 715/234 |
| 7,535,488 | B2 | 5/2009 | Wakao et al. |
| 2002/0040431 | A1 | 4/2002 | Kato et al. |
| 2002/0044662 | A1 | 4/2002 | Sowler |
| 2003/0135753 | A1 | 7/2003 | Batra et al. |
| 2003/0177388 | A1 | 9/2003 | Botz et al. |
| 2003/0217044 | A1 | 11/2003 | Zhang et al. |
| 2004/0148508 | A1 | 7/2004 | Alev et al. |
| 2004/0181756 | A1 | 9/2004 | Berringer et al. |
| 2005/0138378 | A1 | 6/2005 | Pourzandi et al. |

OTHER PUBLICATIONS

Young, Natha; Vuong, Geoffrey; Deng, Yi, "Managing Security Policies in a Distributed Environment using eXensible Markup Language (XML)," Mar. 2001, ACM press, pp. 405-411.*

Chatvichienchai, S.; Iwaihara, M.; Kambayashi, Y., "Translating Content-Based Authorizations for XML Documents," Dec. 10-12, 2003, Web Information Systems Engineering, 2003, WISE 2003, Proceedings of the Fourth International Conference, pp. 103-112.*

"Apache HTTP Server Version 2.0: Authentication, Authorization and Access Control," http://httpd.apache.org/docs-2.0/howto/auth.html, pp. 1-5 and 1-4, Jan. 2004.

"X.509 Certificates and Certificate Revocation Llsts (CRLs)", Sun Microsystems, Inc., pp. 1-5, May 2001.

Aaron Skonnard, "Understanding SOAP", Web Service Basics: Understanding SOAP (SOAP Technical Articles), pp. 1-12, Mar. 2003.

Jeannine Hall Gailey, "Encrypting SOAP Messages Using Web Services Enhancements", Web Services Enhancements (WSE): Encrypting SOAP Messages Using Web Service Enhancements, pp. 1-14, Mar. 2003.

Mohan Rao Cavale, "Dynamic Groups in Windows Server 2003 Authorization Manager", pp. 1-6, Jan. 2003.

James Clark and Steve DeRose, "XML Path Language (XPath) Version 1.0", W2C Recommendation Nov. 16, 1999, pp. 1-37, Nov. 1999.

Park, et al., "An Efficient Stream Authentication Scheme", IEICE Trans. Inf. & Syst., vol. E86-D, No. 4, pp. 704-711, Apr. 2003.

Desmedt et al., "Perfectly Secure Message Transmission Revisited (Extended Abstract)", L.R. Knudsen (Ed.), Eurocrypt 2002, LNCS 2332, pp. 502-517, 2002.

Ren-Junn Hwang et al., "An Enhanced Authentication Key Exchange Protocol", Proceedings of the 17th International Conference on Advanced Information Networking and Applications (AINA '03), pp. 3, Mar. 2003.

Mohammed Al-Ibrahim and Josef Pieprzyk, "Authentication of Transit Flows and K-Siblings One-Time Signature", Advanced Communications and Multimedia Security, pp. 42-55, Sep. 2002.

Matei Ciobanu Morogan and Sead Muftic, "Certificate Management in Ad Hoc Networks", Department of Computer Science, Royal Institute of Technology, pp. 337-341, Jan. 2003.

David Geer, "Taking Steps to Secure Web Services", Technology News, IEEE Computer Society, pp. 14-16, Oct. 2003.

Daniel Fremberg, "The Mithra Authentication Protocol", Dr. Dobb's Journal, www.ddj.com, pp. 44-48, May 2003.

M. Looi, "Enhanced Authentication Services for Internet Systems Using Mobile Networks", IEEE Global Telecommunications Conference, pp. 3468-3472, Nov. 2001.

Matt Bishop, "What Is Computer Security?", IEEE Computer Society, pp. 67-69, Jan. 2003.

Kimitake Wakayama et al., "A Remote User Authentication Method Using Fingerprint Matching", Nagoya Institute of Technology, vol. 44, No. 2, pp. 401-404, Feb. 2003.

Bin-Tsan Hsieh et al., "On The Security of Some Password Authentication Protocols", Informatica, vol. 14, No. 2, pp. 195-204, 2003.

Chen Lin et al., "A Multi-Hierachy Model for Role-Based Control", Journal of Huazhong University of Science and Technology (Nature Science Edition), vol. 30, No. 2, pp. 102-104, Feb. 2002.

Yeubin Bai and Hidetsune Kobayashi, "New String Matching Technology for Network Security", IEEE, pp. 198-201, Mar. 2003.

Richard R. Rogoski, "Safe and Secure", Health Management Technology, www.healthmgttech.com, pp. 4, Dec. 2002.

Donald Beaver "Network Security and Storage Security: Symmetries and Symmetry-Breaking", IEEE, pp. 3-9, Dec. 2003.

Sylvia Osborn, "Database Security Integration Using Role-Based Access Control", Department of Computer Science, The University of Western Ontario, Ch. 22, pp. 245-257, Aug. 2000.

Wolfgang Essmayr and Edgar Weippl, "Identity Mapping—An Approach to Unravel Enterprise Security Management Policies", Software Competence Center Hagenberg, pp. 78-88, Aug. 2000.

Wei-qiang Sun et al., "A Stateful Multicast Access Control Mechanism for Future Metro-Area Networks", Electronic Networking Applications and Policy, vol. 13, No. 2, pp. 134-138, Third International Network Conference 2002; Jul. 2002.

Clark, et al., XML Path Language (XPath), W3C, 1993, pp. 37.

Fielding, "Relative uniform Resource Locators", RFC 1808, Jun. 1995, pp. 23.

Bartel, et al., "XML-Signature Syntax and Processing", retrieved on Feb. 26, 2004 at <<http://www.w3.org/TR/2002/REC-xmldsig-core-20020212/>>, W3C Recommendation Feb. 12, 2002, W3C, 2002, pp. 1-64.

Boyer, et al., "XML-Signature XPath Filter 2.0", retrieved on Feb. 26, 2004 at <<http://www.w3.org/TR/2002/REC-xmldsig-filter2-20021108>>, W3C Recommendation Nov. 8, 2002, W3C, 2002, pp. 1-13.

Srivastava, "Secure It—WS-Security and Remoting Channel Sinks Give Message-level Security to Your SOAP Packets", MSDN Magazine, vol. 18, No. 11, Nov. 2003, pp. 91-98.

* cited by examiner

SECURITY SCOPES AND PROFILES

CROSS REFERENCE TO RELATED APPLICATIONS

This application is related to co-pending U.S. patent application Ser. No. 10/780,274, filed Feb. 16, 2004 entitled "Generic Security Claim Processing Model".

FIELD

Various embodiments described below relate generally to security systems for computing environments, and more particularly but not exclusively to security systems having a mechanism to identify types of information that need to be secured and another mechanism to specify how the types are to be secured.

BACKGROUND

Many message-based computing systems include security infrastructure to secure messages (e.g., integrity, confidentiality message authentication, signer authentication, sender authorization, etc.) sent from a sender to a recipient or receiver and to provide access control to resources targeted by the message. In some systems, a message requiring security can be sent to the receiver via one or more intermediate nodes. In a common scenario, an application to be run on a computing platform will have certain security requirements that the application attempts to satisfy via the security infrastructure.

Typical conventional security infrastructures are: (1) implemented either by a developer who writes the application (i.e., by which security is controlled by the code), which typically requires the developer to accurately know the environment in which the application will operate; or (2) configured/managed by an administrator for the computing system (after being installed by a deployer or configurer). Further, in typical conventional systems, the security infrastructure is selectively configured to either secure none of the messages or to secure all of the messages sent by the application. For example, the deployer can define a "policy" that all messages are to be secured using HyperText Transfer Protocol Secure (https).

SUMMARY

In accordance with aspects of the various described embodiments, a security system is provided with a mechanism to identify types of information that need to be secured and another mechanism to specify how the types are to be secured. The system includes a sender having an application and a receiver having a security module and one or more datastores to store information related to types of information that need to be secured (also referred to herein as "scopes"), how information is to be secured (also referred to herein as "profiles"), and a mapping between the scopes and profiles. In one embodiment, scopes not only identify the "type" of information to be secured, but also represent development time security decisions related to these "types" (e.g. whether it needs to be signed or encrypted). The profile compliments the scope by supplying deployment time decisions indicating how the requirements of the scope will be satisfied (e.g. what security tokens or algorithm to use). In one embodiment, scopes are implemented by application developers, whereas profiles are implemented by application deployers and/or administrators.

In operation, when a receiver receives the message, the receiver's security module determines which scope is appropriate for the message, and then determines the profile that is mapped to the scope via a binding. The security module can then make an access control decision using the profile.

This aspect allows more flexibility in implementing the security infrastructure (e.g., adjusting the security infrastructure to the particular environment, providing selectivity in which information is to be secured and how it is to be secured, and others). This aspect also simplifies the security tasks for the developer (e.g., the developer no longer needs to know the environment) and for the deployer and/or administrator (e.g., no need for access to source code, no need to provide sensitive information about users and/or the computing systems to the developer). In addition, the same application binary can be used in multiple deployment environments. Still further, scopes and profiles represent the security policy of the exchange, which can simplify the discovery and compliance with the security policy. In some embodiments, this discovery and compliance process can be automated.

In another aspect, a sender may also use scopes and profiles to secure an outgoing message. In a related aspect, intermediaries may also use scopes and profiles for security processing of messages. In some embodiments, these aspects need not be implemented.

In still another aspect, scopes are selected for a particular message using XPath-based expressions to determine whether a message has a preselected "pattern". In yet another aspect, scopes are selected by determining whether the message contains a preselected Simple Object Access Protocol (SOAP) action.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
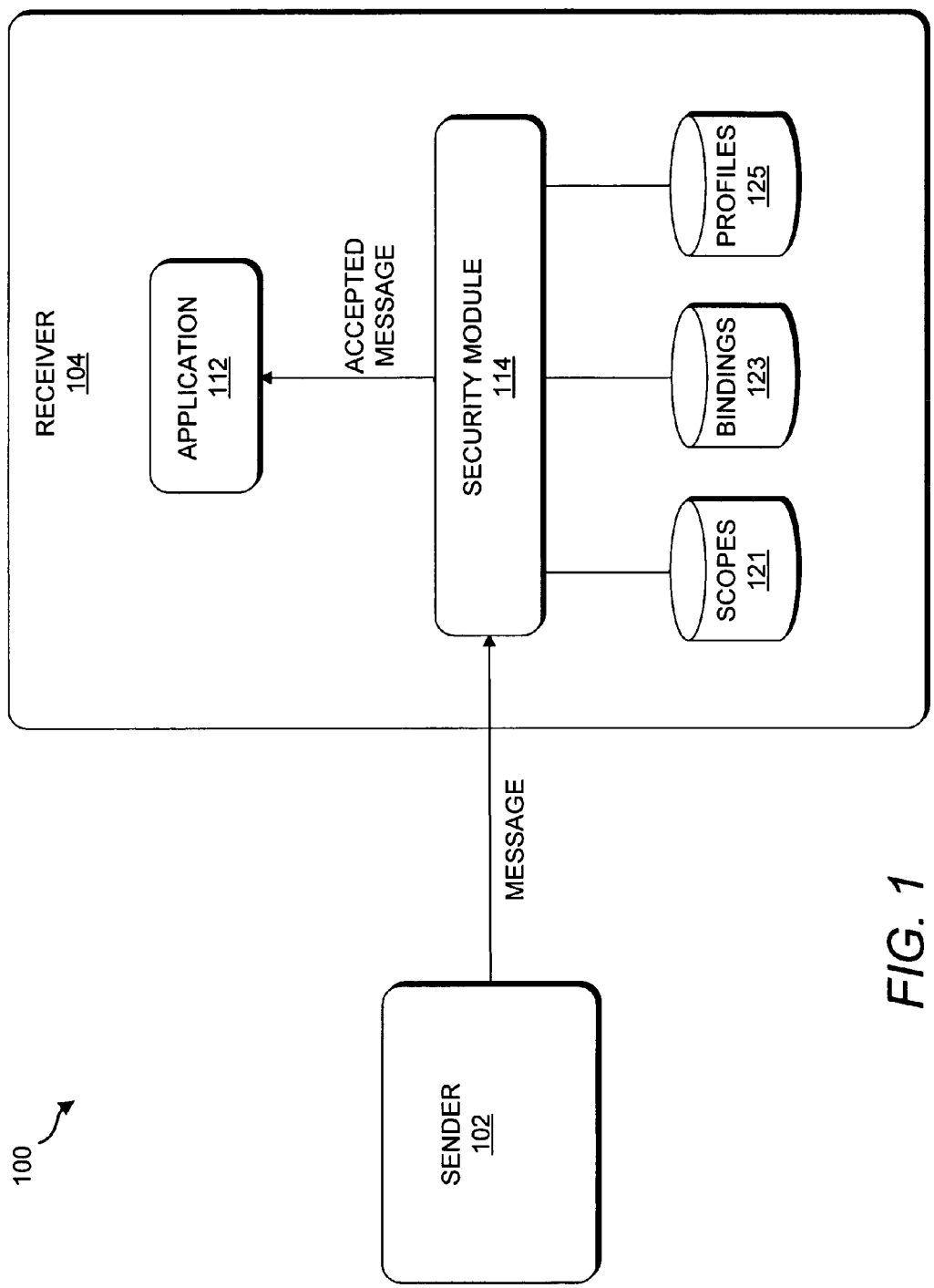
FIG. 1 is a block diagram illustrating a system with mechanisms to identify types of information that need to be secured and to specify how the message types are to be secured, which can be applied to senders, receivers and/or intermediaries, according to one embodiment.

FIG. 1 is a block diagram illustrating a message-based system 100 with mechanisms to identify types of information that need to be secured and to specify how the message types are to be secured, according to one embodiment. In this example, system 100 includes a sender 102 and a receiver 104. Sender 102 and receiver 104, for example, can be different processes executing on a single computing platform, within the same process, or different nodes of a network. In general system 100 can include other nodes (not shown), which are omitted to enhance the clarity of this disclosure. Receiver 104 includes an application 112 and a security module 114. In accordance with this embodiment, receiver 104 also includes a scopes datastore 121, a bindings datastore 123 and a profiles datastore 125.

Scopes datastore 121 includes information (also referred to as "scopes") identifying types of information (e.g., messages) that need to be secured. In one embodiment, the developer(s) of application 112 define or provide scope(s) that each define a filter that, in effect, screen messages to identify those that are associated with that scope. Scopes also define general security settings required for messages that are identified with the scope. For example, a particular scope may require that the message be digitally signed and encrypted. In addition, scopes datastore 121 may include a default or "match-all" scope for messages that cannot be identified with any of the other scopes. Typically, scopes are representative of application-level, platform-independent and/or environment-independent message security settings.

In one example, a scope may be selected for a particular message using XPath-based expressions (e.g., based on XML Path Language (XPath) Version 1.0, W3C Recommendation 16 Nov. 1999). In one embodiment, the XPath expressions are used to evaluate Boolean values (also referred to as "filters"). The XPath-based expressions can be used to determine whether a message has a preselected "pattern". The preselected pattern for a scope may be, for example, "//creditcard", which for some embodiments of application 112 defines a type of message (i.e., a message with credit card information) that must be encrypted and signed. In this example, the scope does not, however, specify how the information must be encrypted and signed. In general, the scope defines which parts of the message matching the scope need to be protected.

Alternatively, a scope may be selected for a particular message using an "action-based" scheme (e.g., based on an operation being requested by the message). For example, in a Simple Object Access Protocol-based (e.g., SOAP Version 1.2 Part 1: Messaging Framework W3C Recommendation 24 Jun. 2003) embodiment, a scope may be selected by determining whether the message contains a preselected SOAP action (as defined by the SOAP Version 1.2 Standard or other related specification(s), such as WS-Addressing). In one embodiment, an XPath expression can be used to determine whether the message includes a particular SOAP action. The selected action may be, for example, "/action( )='URN:bookstore:purchase", which for some embodiments of application 112 defines a type of message (i.e., a message that requests a purchase operation for purchases from a bookstore) that must be encrypted and signed. Again, in this example, the scope does not specify how the information must be encrypted and signed.

Profiles datastore 125 includes information (e.g., also referred to as "profiles") specifying particular settings/operations for securing messages. In one embodiment, the deployer(s) and/or administrator(s) of application 112 define or provide profile(s) that each define relatively more detailed (e.g., when compared to scopes) security settings (e.g., authentication, authorization, encryption/signature algorithms to be used in signing/encrypting a message) to be used with scope. For example, a particular profile may require that the message be digitally signed and encrypted using a selected username/password database (e.g., in a specified XML document) for authentication, and to use the 3DES algorithm for encryption. In contrast to scopes, profiles are typically representative of platform-dependent, environment-dependent and/or administrative-dependent message security settings.

Bindings datastore 123 includes information (e.g., also referred to herein as "bindings" or "mappings") specifying particular mappings of scope(s) to profile(s). In one embodiment, the deployer(s) and/or administrator(s) of application 112 map the scope(s) of scopes datastore 121 to the profile(s) of profiles datastore 125. In some embodiments, the deployer provides the mappings from scope(s) to profile(s) based on the deployer's knowledge of the profile(s), platform, environment, etc. In other embodiments, the developer may "hardcode" one or more selected bindings, depending on the use of application 112. For example, a developer of a medical application may "hardcode" bindings so that scopes related to patient medical information are always mapped to a profile that encrypts this confidential information. In addition, in some embodiments, bindings datastore 123 may include a default binding to map scopes that have not been explicitly bound to a profile. This default binding specifies a "fallback" profile. In this embodiment, the fallback profile, in effect, applies to all scopes but has a lower priority than an explicit binding.

Figure 2:
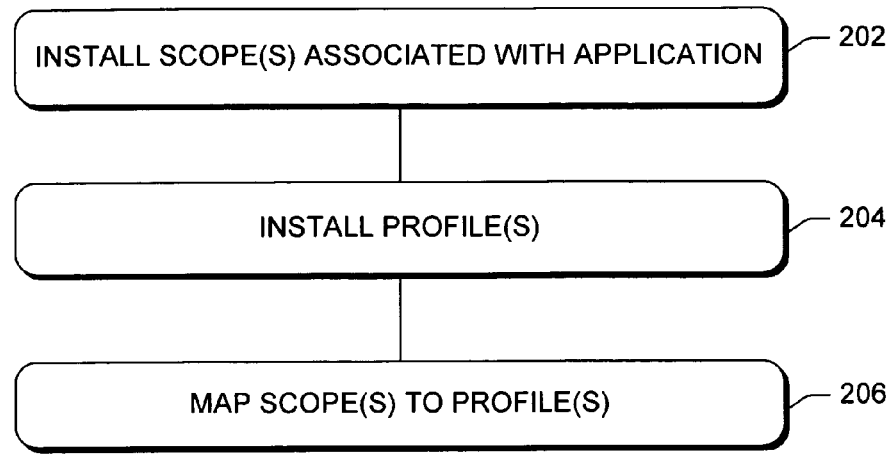
FIG. 2 is a flow diagram illustrating operational flow in configuring a security module as depicted in the system of FIG. 1, according to one embodiment.

FIG. 2 is a flow diagram illustrating operational flow in configuring scopes datastore 121 (FIG. 1), bindings datastore 123 (FIG. 1) and profiles datastores 125 (FIG. 1), according to one embodiment. In a block 202, one or more scopes are installed in scopes datastore 121. As previously described for one embodiment, along with application 112 (FIG. 1), developer(s) can define or implement scope(s) that are needed by or useful to application 112. The developer(s) can then, in this embodiment, provide the scope(s) to a system deployer or configurer. In this embodiment, the one or more of these scopes are installed by the system deployer.

In a block 204, one or more profiles are installed in profiles datastore 125. As previously described for one embodiment, the system deployer or configurer can define or specify one or more profiles in one embodiment. In this embodiment, the one or more profiles are installed by the deployer and can be maintained by the administrator.

In a block 206, the installed one or more scopes are mapped to one or more profiles. In one embodiment, each scope can only be mapped to one profile; however, multiple scopes can be bound to the same profile. As previously described for one embodiment, the system deployer or configurer can define or specify the mappings in one embodiment to be stored in bindings datastore 123. In this embodiment, the one or more mappings are installed by the deployer and can be maintained by the administrator.

In a further refinement, configuration information (e.g., profiles and bindings) can be shared between nodes (not shown) in system 100. For example, the administrator can synchronize profiles and bindings datastores across system 100. In another example, if system 100 includes network accessible storage (NAS), then profiles and bindings datastores 125 and 123 can reside in the NAS.

Figure 3:
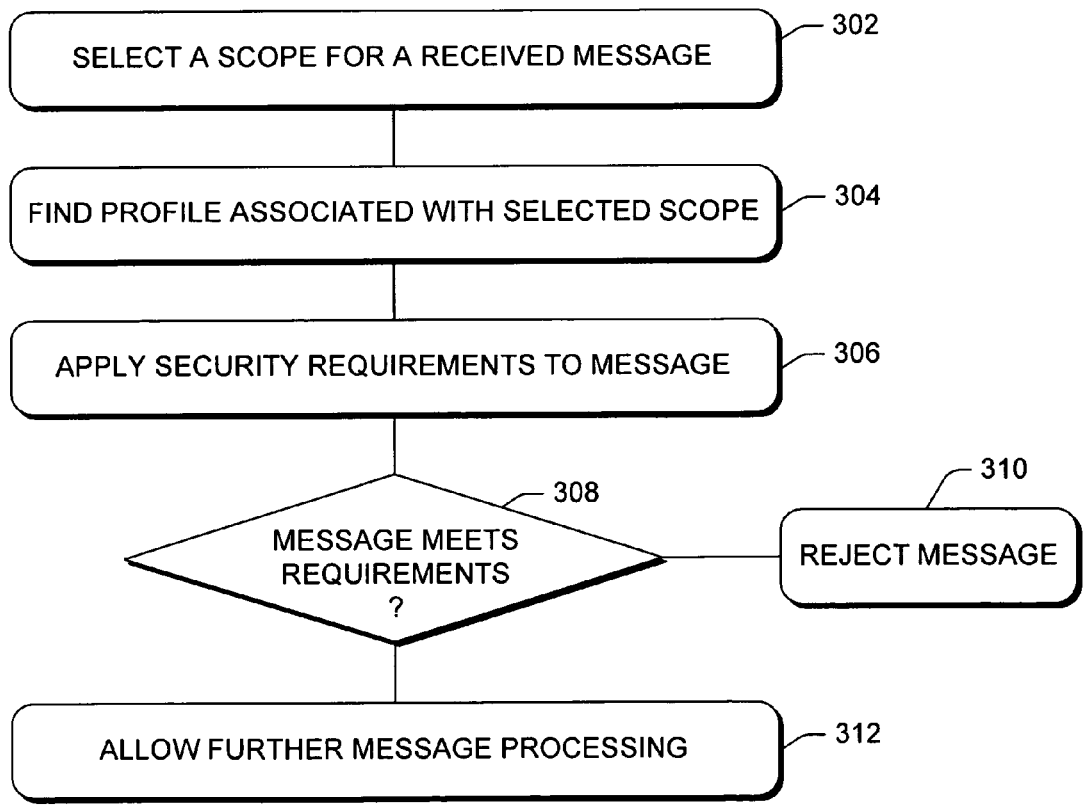
FIG. 3 is a flow diagram illustrating operational flow of a receiver as depicted in the system of FIG. 1 in security processing of a received message, according to one embodiment.

FIG. 3 is a flow diagram illustrating operational flow of receiver 104 as depicted in the system of FIG. 1 in security processing of a received message, according to one embodiment. Referring to FIGS. 1 and 3, this exemplary operational flow proceeds as set forth below.

In a block 302, a scope is selected for the received message. In this embodiment, security module 114 determines whether a scope of scopes datastore 121 matches the message. In one embodiment, security module 114 uses XPath-based expressions to determine whether the message is of a particular type associated with a scope contained in scopes datastore 121, as previously described. In another embodiment, security module 114 uses an action-based algorithm to determine whether the message matches a scope contained in scopes datastore 121, as described above. In other embodiments, different algorithms may be used to match a scope to the message.

In some scenarios, multiple scopes could apply to a single message (i.e., also referred to herein as overlapping scopes). In one embodiment, if this were to occur, the operation can be aborted and an error message generated. In another embodiment, security module 114 could be configured to determine at start-up or compile time whether two or more scopes could apply to one message. If so, security module 114 could then prompt for user intervention to refine the scopes so that the scopes no longer overlap. In an alternative embodiment, security module 114 could be configured to resolve overlapping scopes by merging the requirements of both scopes (if they are not conflicting). In yet another embodiment, one of the overlapping scopes could be selected based on some predetermined criteria (e.g., strictest security requirements, scopes could be assigned a ranking when defined, with the highest ranking scope being selected, etc.)

In a block 304, a profile is selected for the scope that was selected in block 302. In one embodiment, security module 114 uses a mapping contained in bindings datastore 123 to select a profile from profiles datastore 125. For example, in one embodiment, bindings datastore 123 includes a lookup table of profiles that are indexed by scope. In other embodiments, different schemes may be used to find a profile that is associated to the scope selected in block 302.

In a block 306, security requirement(s) derived from the scope selected in block 302 and the profile selected in block 304 are applied to the received message. In one embodiment, security module 114 applies the security requirements. For example, the security requirements can include authentication, authorization and access control requirements as described in the aforementioned co-pending U.S. Patent Application entitled "Generic Security Claim Processing Model".

In a decision block 308, it is determined whether the received message meets the security requirements that were applied in block 306. In one embodiment, security module 114 is configured to make this decision. If the security requirements are not met, in a block 310, the message is rejected. Conversely, if the security requirements are met, in a block 312, the message can undergo further processing. For example, the message can be processed by application 114.

Figure 4:
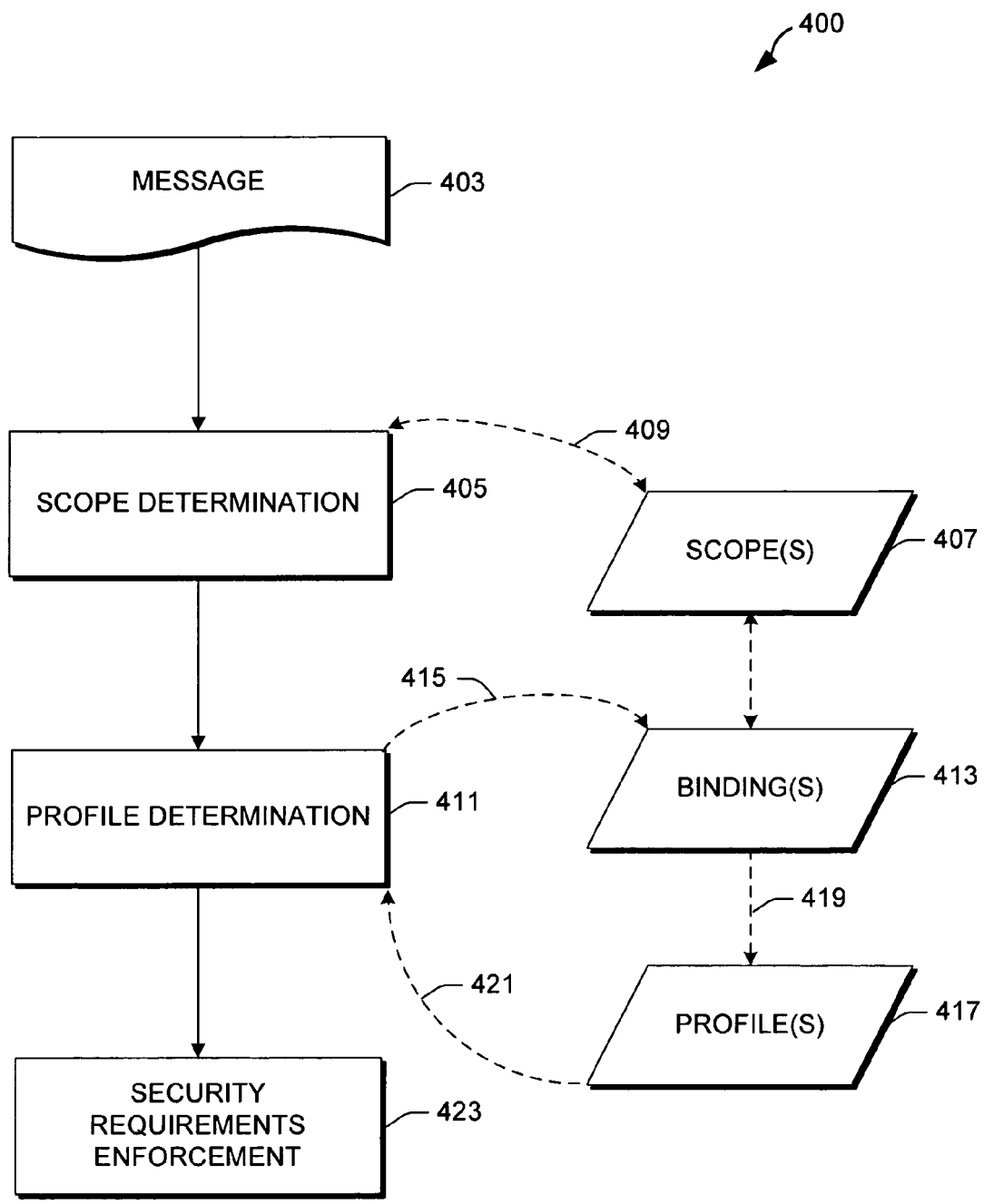
FIG. 4 is a flow diagram illustrating data flow in security processing of a received message, according to one embodiment.

FIG. 4 is a data flow diagram illustrating exemplary data flow 400 in security processing of a received message 403, according to one embodiment. Referring to FIGS. 1 and 4, data flows in one embodiment of system 100 as follows. Sender 102 sends message 403 to receiver 104. Security module 114 then performs a scope determination operation 405 on message 403. In this embodiment, in performing operation 405, security module 114 finds a scope from scope (s) 407 (e.g., stored in scopes datastore 121) that applies to the message, as indicated by an arrow 409. In one embodiment, security module 114 performs operation 405 as described in block 302 (FIG. 3).

Security module 114 then performs a profile determination operation 411 using the scope obtained from performing scope determination operation 405. In this embodiment, in performing operation 411, security module 114 finds a profile from profile(s) 417 (e.g., stored in profiles datastore 125) using a corresponding binding from bindings 413 (e.g., stored in bindings datastore 123), as indicated by arrows 415, 419 and 421. In one embodiment, security module 114 performs operation 411 as described in block 304 (FIG. 3).

The dataflow continues to an apply profile operation 423 using the profile obtained from performing apply profile operation 411. In one embodiment, security module 114 applies security requirements derived from the obtained profile to message 403 as described in block 306 (FIG. 3).

Security module 114 also performs access control operations to accept or deny message 403 based on whether message 403 met the security requirements of derived from the obtained scope and profile. In one embodiment, security module 114 makes an access control decision for message 403 as described in blocks 308, 310 and 312 (FIG. 3).

Figure 5:
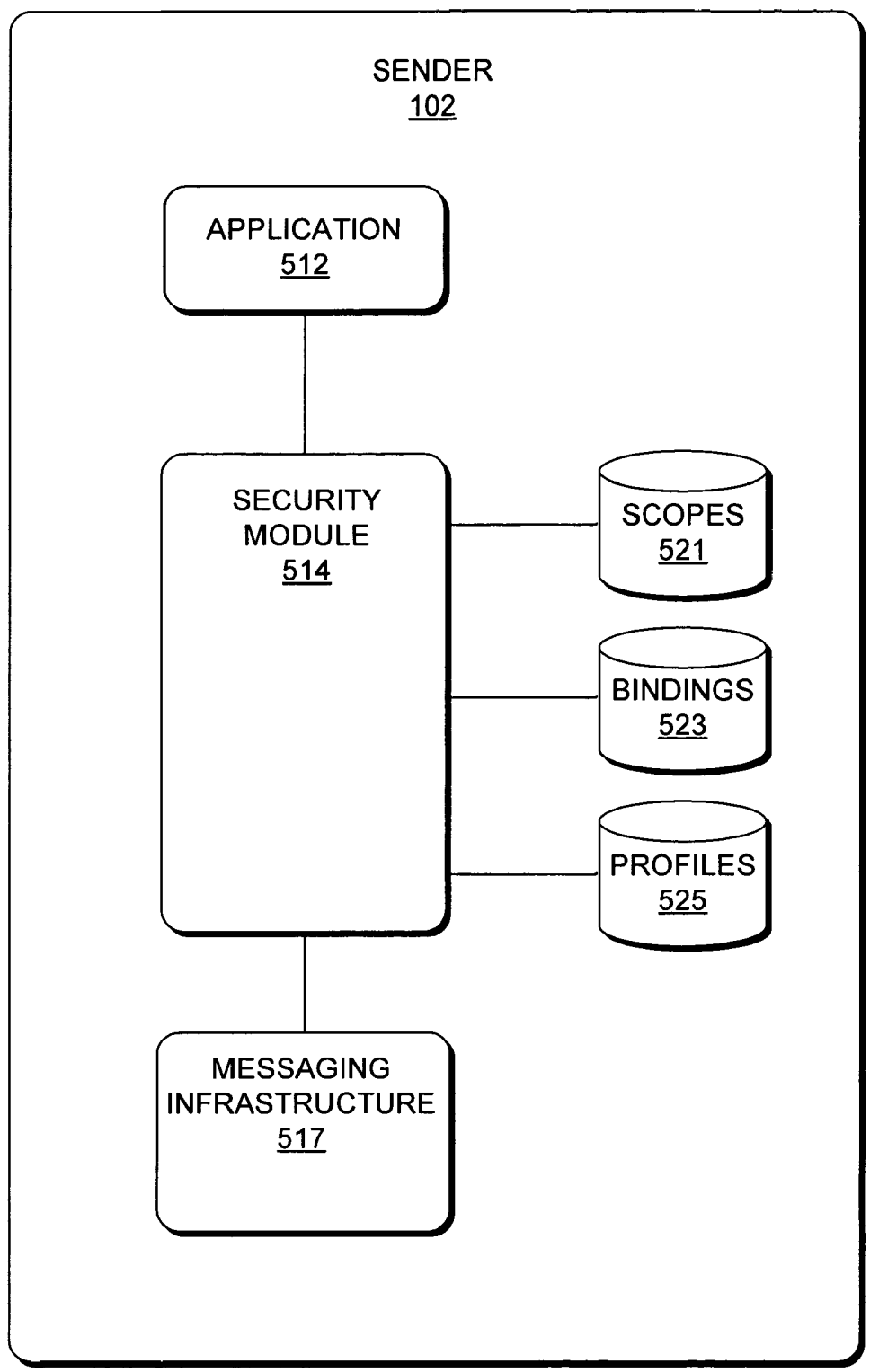
FIG. 5 is a block diagram illustrating a sender as depicted in FIG. 1, according to one embodiment.

FIG. 5 illustrates an embodiment of sender 102 (FIG. 1), having optional "send-side" security scopes and profiles. In this example embodiment, sender 102 includes an application 512, a security module 514, and messaging infrastructure 517. In accordance with this embodiment, sender 102 also includes a scopes datastore 521, a bindings datastore 523 and a profiles datastore 525, which are substantially similar to datastores 121, 123 and 125 (FIG. 1), respectively.

In operation, a message to be sent by sender 102 would be processed by security module 514 before being passed to messaging infrastructure 517 for transmission to a receiver. In a manner similar to that described above (in conjunction with FIGS. 1 and 3) for security module 114, security module 514 would process the outgoing message to find a matching scope from scopes datastore 521, and map the matching scope to a corresponding profile from profiles datastore 525 using mappings from bindings datastore 523. The security requirements from the selected profile could include, for example, prohibiting unencrypted messages from being sent, or requiring a digital signature be added to the message. In some scenarios, portions of messages must remain unencrypted or if encrypted, using encryption methods encrypted with "lower" encryption algorithms to conform to applicable law. In such scenarios, this embodiment of sender 102 can be used to ensure that these message portions conform to the applicable law (or company policies or regulations for workplace scenarios).

In a further refinement, this embodiment of sender 102 can be configured to obtain the receiver's security requirements or "policies". For example, a receiver may have a policy that all messages must be secured using specified mechanisms/methods. In yet another refinement, in scenarios in which a node in system 100 (FIG. 1) may serve as both a sender and a receiver, the node would have both send-side and receive-side scopes/profiles/bindings that would be used depending on whether the node was sending or receiving a message.

The various embodiments described above may be implemented in computer environments of the senders and receivers. An example computer environment suitable for use in the senders and receivers is described below in conjunction with FIG. 6.

Figure 6:
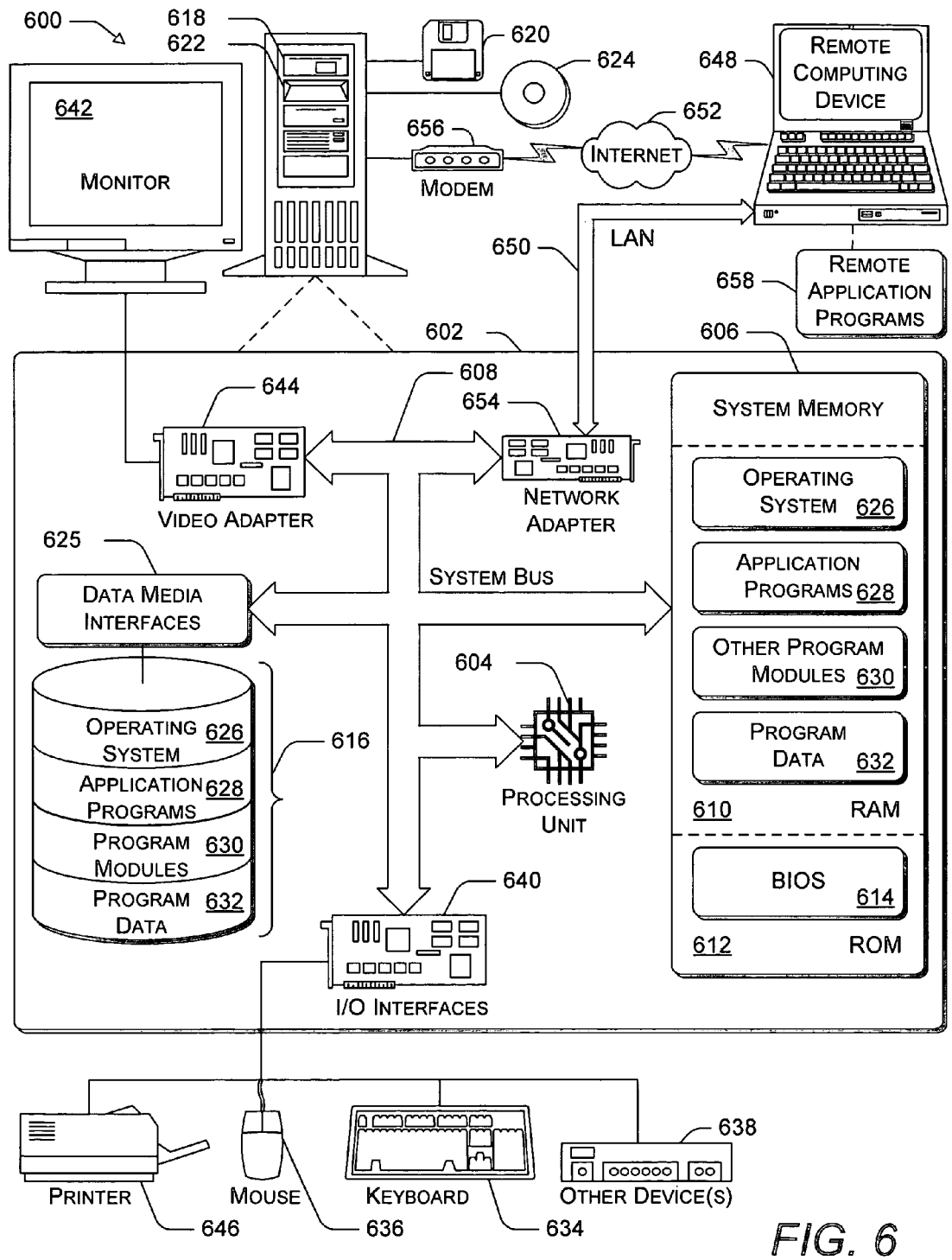
FIG. 6 is a block diagram illustrating an example computing environment suitable for practicing the above embodiments.

FIG. 6 illustrates a general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602. The components of computer 602 can include, but are not limited to, one or more processors or processing units 604, system memory 606, and system bus 608 that couples various system components including processor 604 to system memory 606.

System bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 602 may include a variety of computer readable media. Such media can be any available media that is accessible by computer 602 and includes both volatile and non-volatile media, removable and non-removable media.

System memory 606 includes computer readable media in the form of volatile memory, such as random access memory (RAM) 610; and/or non-volatile memory, such as read only memory (ROM) 612 or flash RAM. Basic input/output system (BIOS) 614, containing the basic routines that help to transfer information between elements within computer 602, such as during start-up, is stored in ROM 612 or flash RAM. RAM 610 typically contains data and/or program modules that are immediately accessible to and/or presently operated on by processing unit 604.

Computer 602 may also include other removable/non-removable, volatile/non-volatile computer storage media. By way of example, FIG. 6 illustrates hard disk drive 616 for reading from and writing to a non-removable, non-volatile magnetic media (not shown), magnetic disk drive 618 for reading from and writing to removable, non-volatile magnetic disk 620 (e.g., a "floppy disk"), and optical disk drive 622 for reading from and/or writing to a removable, non-volatile optical disk 624 such as a CD-ROM, DVD-ROM, or other optical media. Hard disk drive 616, magnetic disk drive 618, and optical disk drive 622 are each connected to system bus 608 by one or more data media interfaces 625. Alternatively, hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, removable magnetic disk 620, and removable optical disk 624, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 616, magnetic disk 620, optical disk 624, ROM 612, and/or RAM 610, including by way of example, operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as keyboard 634 and a pointing device 636 (e.g., a "mouse"). Other input devices 638 (not shown specifically) may include a microphone, joystick, game pad, satellite dish, serial port, scanner, and/or the like. These and other input devices are connected to processing unit 604 via input/output interfaces 640 that are coupled to system bus 608, but may be connected by other interface and bus structures, such as a parallel port, game port, or a universal serial bus (USB).

Monitor 642 or other type of display device can also be connected to the system bus 608 via an interface, such as video adapter 644. In addition to monitor 642, other output peripheral devices can include components such as speakers (not shown) and printer 646, which can be connected to computer 602 via I/O interfaces 640.

Computer 602 can operate in a networked environment using logical connections to one or more remote computers, such as remote computing device 648. By way of example, remote computing device 648 can be a PC, portable computer, a server, a router, a network computer, a peer device or other common network node, and the like. Remote computing device 648 is illustrated as a portable computer that can include many or all of the elements and features described herein relative to computer 602. Alternatively, computer 602 can operate in a non-networked environment as well.

Logical connections between computer 602 and remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, computer 602 is connected to local network 650 via network interface or adapter 654. When implemented in a WAN networking environment, computer 602 typically includes modem 656 or other means for establishing communications over wide network 652. Modem 656, which can be internal or external to computer 602, can be connected to system bus 608 via I/O interfaces 640 or other appropriate mechanisms. It is to be appreciated that the illustrated network connections are examples and that other means of establishing at least one communication link between computers 602 and 648 can be employed.

In a networked environment, such as that illustrated with computing environment 600, program modules depicted relative to computer 602, or portions thereof, may be stored in a remote memory storage device. By way of example, remote application programs 658 reside on a memory device of remote computer 648. For purposes of illustration, applications or programs and other executable program components such as the operating system are illustrated herein as discrete blocks, although it is recognized that such programs and components reside at various times in different storage components of computing device 602, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method, comprising:
   on a device configured as part of a security infrastructure to receive messages, receiving a message;
   selecting a first set of security information from a first plurality of sets of security information as a function of a property of the message, wherein the first set of security information comprises security settings that define types of messages that must be secured and wherein the types of messages that must be secured are defined and provided by an application developer;
   selecting a second set of security information from a second plurality of sets of security information as a function of the first set, wherein the second set of security information comprises security settings that specify particular operations and settings for securing the messages, wherein the particular operations and settings comprises algorithms to be used in signing and encrypting the messages, and wherein the second set is a distinct set from that of the first set; and
   applying the second set of security information to the message.

2. The method of claim 1, wherein applying the second set of security information to the message further comprises applying security information derived from the first set.

3. The method of claim 1, further comprising determining whether the message satisfies a security requirement derived from security information of the second set.

4. The method of claim 3, wherein determining whether the message satisfies a security requirement derived from security information of the second set further comprises determining whether the message satisfies a security requirement derived from security information of the first set.

5. The method of claim 3, further comprising rejecting the message if the message does not satisfy the security requirement.

6. The method of claim 5, further comprising accepting the message if the message satisfies all security requirements included in the second set.

7. The method of claim 6, wherein the message is received after transmission from a sender.

8. The method of claim 1, wherein the message is to be transmitted to another process.

9. The method of claim 8, further comprising securing the message before the message is transmitted.

10. The method of claim 1, wherein the second plurality of sets of security information are shared between nodes of a network.

11. The method of claim 1, wherein the first set is selected using an XPath-based expression to match a preselected pattern.

12. The method of claim 1, wherein the first set is selected using Simple Object Access Protocol (SOAP) actions.

13. A machine-readable storage medium having instructions for performing the method of claim 1.

14. A system comprising:
    a processor;
    a memory coupled to the processor to store at least a portion of a plurality of datastores;
    a first datastore to include a first plurality of sets of security settings related to an application residing in the system, wherein the first plurality of sets define messages that must be secured and wherein the types of messages that must be secured are defined and provided by an application developer;
    a second datastore to include a second plurality of sets of security settings, wherein the second plurality of sets specify settings and operations for securing messages, wherein the particular operations and settings comprise algorithms to be used in signing and encrypting the messages and wherein a set of the first plurality of sets is associated with a set of the second plurality of sets; and
    a module to select the first set from the first plurality of sets as a function of a property of a received message.

15. The system of claim 14 wherein the first and second datastores are part of a single larger datastore.

16. The system of claim 14 wherein the module is further to apply security information included in a second set of the second plurality of sets to the received message.

17. The system of claim 16, wherein the module is further to apply security information included in the first set to the received message.

18. The system of claim 16, wherein the module is further to determine whether the received message satisfies a security requirement included in security information of the second set.

19. The system of claim 18, wherein the module is further to reject the message if the message does not satisfy the security requirement.

20. The system of claim 19, wherein the module is further to accept the message if the message satisfies all security requirements included in the security information of the second set.

21. The system of claim 14, further comprising a third datastore to include mappings from sets of the first plurality of sets to sets of the second plurality of sets, wherein the second set is associated with the first set by a mapping included in the third datastore.

22. The system of claim 14, wherein the module is to select the first set using an XPath-based expression to match a preselected pattern.

23. The system of claim 14, wherein the module is to select the first set using a predetermined Simple Object Access Protocol (SOAP) action.

24. The system of claim 14, wherein the second plurality of sets are shared between nodes of the system.

25. A machine-readable storage medium having instructions for performing a method, comprising:
steps for receiving a message;
steps for selecting a first set of security information from a first plurality of sets of security information as a function of a property of the message, wherein the first set of security information comprises security settings that define types of messages that must be secured and wherein the types of messages that must be secured are defined and provided by an application developer;
steps for selecting a second set of security information from a second plurality of sets of security information as a function of the first set, wherein the second set of security information comprises security settings that specify particular operations and settings for securing the messages, wherein the particular operations and settings comprise algorithms to be used in signing and encrypting the messages; and
steps for applying the second set of security information to the message.

26. The machine-readable storage medium of claim 25, further comprising steps for determining whether the message satisfies a security requirement derived from the first and/or second sets.

27. The machine-readable storage medium of claim 26, further comprising steps for rejecting the message if the message does not satisfy the security requirement.

28. The machine-readable storage medium of claim 26, further comprising steps for accepting the message if the message satisfies all security requirements derived from the first and second sets.

29. The machine-readable storage medium of claim 28, wherein the message is received after transmission from a sender.

30. The machine-readable storage medium of claim 25, wherein the message is to be transmitted to another process.

31. The machine-readable storage medium of claim 30, further comprising steps for securing the message before the message is transmitted.

32. The machine-readable storage medium of claim 25, wherein the second plurality of sets of security information are shared between nodes of a network.

33. The machine-readable storage medium of claim 25, wherein the steps for selecting the first set uses an XPath-based expression to match a preselected pattern.

34. The machine-readable storage medium of claim 25, wherein the steps for selecting the first set selects the first set using Simple Object Access Protocol (SOAP) actions.

* * * * *